(12) United States Patent
Lee

(10) Patent No.: US 11,285,863 B2
(45) Date of Patent: Mar. 29, 2022

(54) LIGHTING APPARATUS OF AUTONOMOUS VEHICLE HAVING A MOUNTED LAMP BOX WITH LAMP UNITS AND SENSING UNITS

(71) Applicant: HYUNDAI MOBIS Co., Ltd., Seoul (KR)

(72) Inventor: Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/905,273

(22) Filed: Jun. 18, 2020

(65) Prior Publication Data
US 2020/0398735 A1    Dec. 24, 2020

(30) Foreign Application Priority Data
Jun. 18, 2019    (KR) .................. 10-2019-0072205

(51) Int. Cl.
| | |
|---|---|
| *B60Q 1/00* | (2006.01) |
| *F21V 23/00* | (2015.01) |
| *F21S 41/663* | (2018.01) |
| *F21V 23/04* | (2006.01) |
| *B60Q 1/06* | (2006.01) |
| *B60Q 3/20* | (2017.01) |
| *B60Q 1/50* | (2006.01) |
| *B60Q 1/30* | (2006.01) |
| *F21W 106/00* | (2018.01) |
| *F21Y 115/10* | (2016.01) |

(52) U.S. Cl.
CPC .............. *B60Q 1/0023* (2013.01); *B60Q 1/06* (2013.01); *B60Q 1/30* (2013.01); *B60Q 1/50* (2013.01); *B60Q 3/20* (2017.02); *F21S 41/663* (2018.01); *F21V 23/003* (2013.01); *F21V 23/0478* (2013.01); *F21W 2106/00* (2018.01); *F21Y 2115/10* (2016.08)

(58) Field of Classification Search
CPC . F21Y 2105/10; B60Q 1/0023; B60Q 1/2611; B60Q 1/02
See application file for complete search history.

(56) References Cited

U.S. PATENT DOCUMENTS

| | | | |
|---|---|---|---|
| 10,470,274 B2 * | 11/2019 | Masuda | ............... B60Q 1/2611 |
| 2011/0242320 A1 * | 10/2011 | Yamada | ................. G03B 37/04 |
| | | | 348/148 |
| 2012/0166033 A1 | 6/2012 | Byun et al. | |
| 2015/0377453 A1 * | 12/2015 | Ji | .......................... F21S 41/321 |
| | | | 362/607 |

FOREIGN PATENT DOCUMENTS

KR    20120072020    7/2012

* cited by examiner

*Primary Examiner* — Robert J May
(74) *Attorney, Agent, or Firm* — H.C. Park & Associates, PLC

(57) ABSTRACT

A lighting apparatus of an autonomous vehicle including a lamp box disposed in a roof part of a vehicle; one or more front lamp units housed in a front portion of the lamp box and configured to distribute light to a forward area of the vehicle; one or more rear lamp units housed in a rear portion of the lamp box and configured to distribute light to a rearward area of the vehicle; one or more interior lamp units disposed at the bottom of the lamp box, and configured to distribute light to an indoor area of the vehicle; and a control unit configured to control operations of the front lamp unit, the rear lamp unit and the interior lamp unit.

15 Claims, 9 Drawing Sheets

LIGHTING APPARATUS OF AUTONOMOUS VEHICLE HAVING A MOUNTED LAMP BOX WITH LAMP UNITS AND SENSING UNITS

CROSS-REFERENCE TO RELATED APPLICATION

This application claims priority from and the benefit of Korean Patent Application No. 10-2019-0072205, filed on Jun. 18, 2019, which is hereby incorporated by reference for all purposes as if set forth herein.

BACKGROUND

Field

Exemplary embodiments of the present disclosure relate to an autonomous vehicle, and more particularly, to a lighting apparatus of an autonomous vehicle, which has a structure in which a plurality of lamps for a vehicle are modularized.

Discussion of the Background

In general, autonomous driving technology is divided into five levels. Autonomous driving level 0 indicates the step in which a driver directly controls all operations required for driving a vehicle, autonomous driving level 1 indicates the step in which a driver selectively controls the speed and direction of a vehicle using cameras and sensors such as cruise control, a lane departure warning system and a collision warning system, and autonomous driving level 2 indicates the step in which a vehicle travels by itself in a specific situation and adjusts speed to maintain a distance to a vehicle ahead.

Autonomous driving level 3 indicates a step in which intervention of a driver is further reduced and a vehicle can sense and avoid an obstacle by itself and bypass a road when the road is blocked, autonomous driving level 4 indicates a step in which a driver may only set a destination and the system of a vehicle monitors the entire moving section and performs safety-related functions by itself, and autonomous driving level 5 indicates a step corresponding to a self-driving vehicle which moves without a driver.

Conventional vehicle lamps include a headlamp, a rear lamp and an interior lamp which are independently disposed. The headlamp serves to produce illumination for forward lighting, the rear lamp serves to inform a rearward vehicle of an ego vehicle's state, and the interior lamp serves to produce illumination for indoor lighting. An autonomous vehicle includes various sensors such as a radar, a LiDAR (Light Detection And Ranging) and a camera as well as such lamps. In most cases, the radar is mounted in a bumper, the camera is mounted in a windshield inside the vehicle, and the LiDAR is mounted in the headlamp and the rear lamp.

Vehicles are evolving from internal combustion engine vehicles to electric vehicles and from manual driving vehicles to autonomous vehicles. Thus, according to the recent trend for vehicles, the bonnet areas of vehicle bodies are gradually reduced, and the indoor areas or cabin areas of vehicles are expanded. Such a trend makes it difficult to dispose lamp electronic parts and sensor electronic parts, which have been mainly installed in the bonnet areas, and limits the vehicle body design.

The related art of the present disclosure is disclosed in Korean Patent Application No. 2012-0072020 published on Jul. 3, 2012 and entitled "Method and Apparatus for Detecting Run and Road Information of Autonomous Driving System".

The above information disclosed in this Background section is only for enhancement of understanding of the background of the invention and, therefore, it may contain information that does not constitute prior art.

SUMMARY

Exemplary embodiments of the present invention are directed to a lighting apparatus of an autonomous vehicle, which has a structure in which lamp electronic parts can be more freely and easily arranged and designed in a cabin area of a vehicle, and can improve the degree of freedom in design of a vehicle body.

In an embodiment, a lighting apparatus of an autonomous vehicle may include a lamp box disposed in a roof part of a vehicle; one or more front lamps unit housed in a front portion of the lamp box and configured to distribute light to a forward area of the vehicle; one or more rear lamp units housed in a rear portion of the lamp box and configured to distribute light to a rearward area of the vehicle; one or more interior lamp units disposed at the bottom of the lamp box, and configured to distribute light to an indoor area of the vehicle; and a control unit configured to control operations of the front lamp unit, the rear lamp unit and the interior lamp unit.

The lighting apparatus may further include one or more sensor units housed in the lamp box, and configured to sense a driving condition or surrounding situation of the vehicle.

The sensor unit may include one or more front sensors disposed in the front portion of the lamp box so as to be located in parallel to the front lamp unit; and one or more rear sensors disposed in the rear portion of the lamp box so as to be located in parallel to the rear lamp unit.

The front lamp unit may include one or more first front lamps disposed in a left portion of the lamp box; and one or more second front lamps disposed in a right portion of the lamp box. The front sensor may be disposed between the first and second front lamps.

The rear lamp unit may include: one or more first rear lamps disposed in a left portion of the lamp box; and one or more second rear lamps disposed in a right portion of the lamp box. The rear sensor may be disposed between the first and second rear lamps.

The lighting apparatus may further include one or more communication lamp units housed in the lamp box and configured to display information associated with driving of the vehicle.

The communication lamp unit may include one or more front communication lamps disposed under the front lamp unit so as to be extended in a side-to-side direction; and one or more rear communication lamps disposed under the rear lamp unit so as to be extended in the side-to-side direction.

At least one of the front and rear lamp units may include one or more image forming optical units configured to form a light emission area having a beam pattern in which a plurality of unit light emission areas are vertically and horizontally arranged.

The plurality of unit light emission areas of the beam pattern may be vertically symmetrically arranged under the roof part.

The image forming optical unit may include a light source unit having a plurality of light sources arranged vertically and horizontally; and an image forming lens unit configured to refract lights emitted from the plurality of light sources such that the lights propagate to different areas, and form the light emission area whose width is increased more than the unit light emission area.

The light source unit may include a first light source; and a second light source disposed adjacent to the first light source. The light emission area may include: a first unit light emission area formed while light emitted from the first light source transmits the image forming lens unit; and a second unit light emission area formed while light emitted from the second light source transmits the image forming lens unit, and disposed adjacent to the first unit light emission area.

The control unit may include an individual light source controller configured to selectively enable or disable the unit light emission areas.

The individual light source controller may include an input unit configured to receive information from one or more sensor units that senses the surroundings of the vehicle; a light-out area determination unit configured to determine the unit light emission area which needs to be disabled in the light emission area, based on the information inputted from the input unit; and a light source control unit configured to turn off a light source corresponding to the unit light emission area determined by the light-out area determination unit.

The lighting apparatus of the autonomous vehicle in accordance with the embodiment of the present disclosure can implement a lamp module with a new structure, in which the front lamp unit, the rear lamp unit, the interior lamp unit, the control unit and other lamp electronic parts and sensor electronic parts are integrated and packaged in the lamp box disposed in the roof part of the vehicle.

Therefore, the lighting apparatus in accordance with the embodiment of the present disclosure can significantly reduce the number of parts, compared to the structure in which small-size modules corresponding to the front lamp unit, the rear lamp unit, the interior lamp unit, the sensor unit and the communication lamp unit, respectively, are independently disposed at locations which are separated from each other and include the bonnet area of the vehicle. Furthermore, the lamp electronic parts can be easily replaced and maintained.

Furthermore, the lamp electronic parts can be easily installed in the roof part having an infinite available space. Therefore, compared to an embodiment in which lamp electronic parts are disposed and designed in a relatively narrow bonnet area, the lamp electronic parts can be disposed and designed more freely and easily in a cabin area of the vehicle, and the degree of freedom in design of the vehicle body can be improved.

Since the lamp electronic parts are installed in the roof part, the lamp electronic parts do not need to be necessarily reduced in sizes. Therefore, the performances of the front lamp unit, the rear lamp unit, the interior lamp unit and the control unit can be freely improved without a limitation in design by the increase in volumes of electronic parts. Thus, it is possible to improve the autonomous driving performance and use convenience of the vehicle by applying high-specification electronic parts.

The lighting apparatus in accordance with the embodiment of the present disclosure has a structure in which a plurality of lamp electronic parts including the front lamp unit, the rear lamp unit and the interior lamp unit are integrated as one module. Therefore, an electromagnetic radiation test considering electromagnetic interference between the electronic parts can be performed more efficiently than when a plurality of electronic parts are individually tested and assembled to the vehicle body. Thus, it is possible to further reduce errors which occur when electronic components corresponding to the front lamp unit, the rear lamp unit and the interior lamp unit, respectively, are individually tested. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
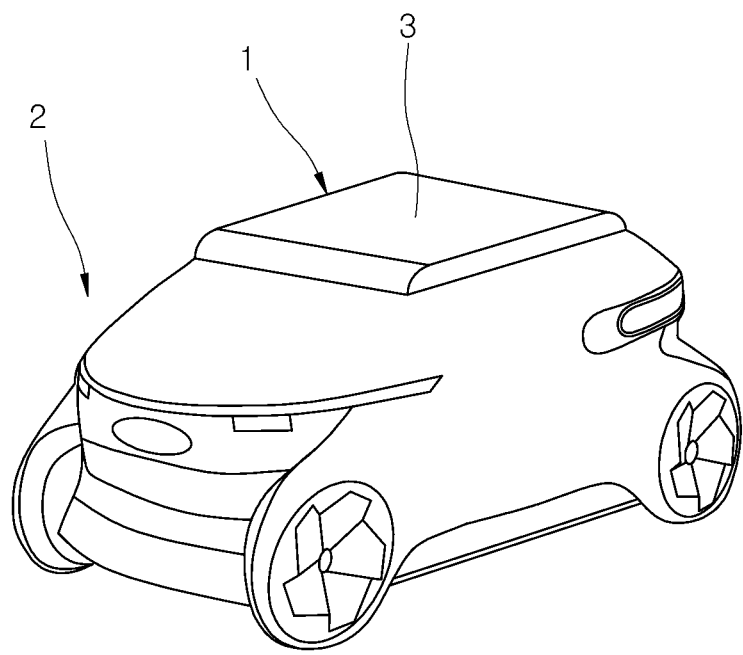
FIG. 1 is a perspective view schematically illustrating a vehicle to which a lighting apparatus of an autonomous vehicle in accordance with an embodiment of the present disclosure is applied.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a lighting apparatus of an autonomous vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definitions of the terms should be made according to the overall disclosures set forth herein.

FIG. 1 is a perspective view schematically illustrating a vehicle to which a lighting apparatus of an autonomous vehicle in accordance with an embodiment of the present disclosure is applied.

Referring to FIG. 1, a lighting apparatus 1 of an autonomous vehicle 2 in accordance with an embodiment of the present disclosure is disposed in a roof part 3 of the vehicle 2. The roof part 3 constitutes the upper portion of the vehicle 2, and the lighting apparatus 1 of the autonomous vehicle 2 in accordance with the embodiment of the present disclosure may be installed in the roof part 3 while having a cover shape which can block the inside of the vehicle 2 from the outside, or a frame shape with an opening such as a sunroof, through which the inside of the vehicle 2 can be opened to the upward outside.

Figure 2:
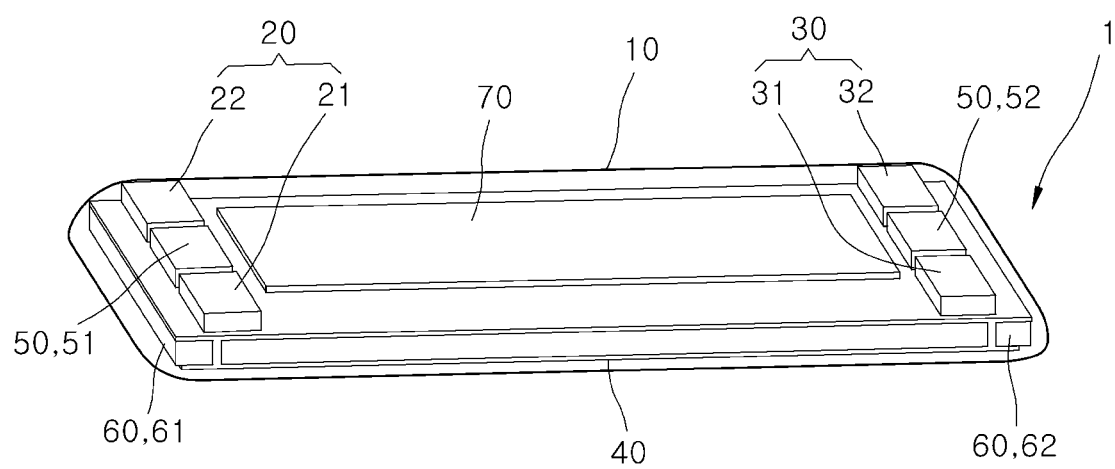
FIG. 2 is a perspective view schematically illustrating the lighting apparatus of the autonomous vehicle in accordance with the embodiment of the present disclosure.
Figure 3:
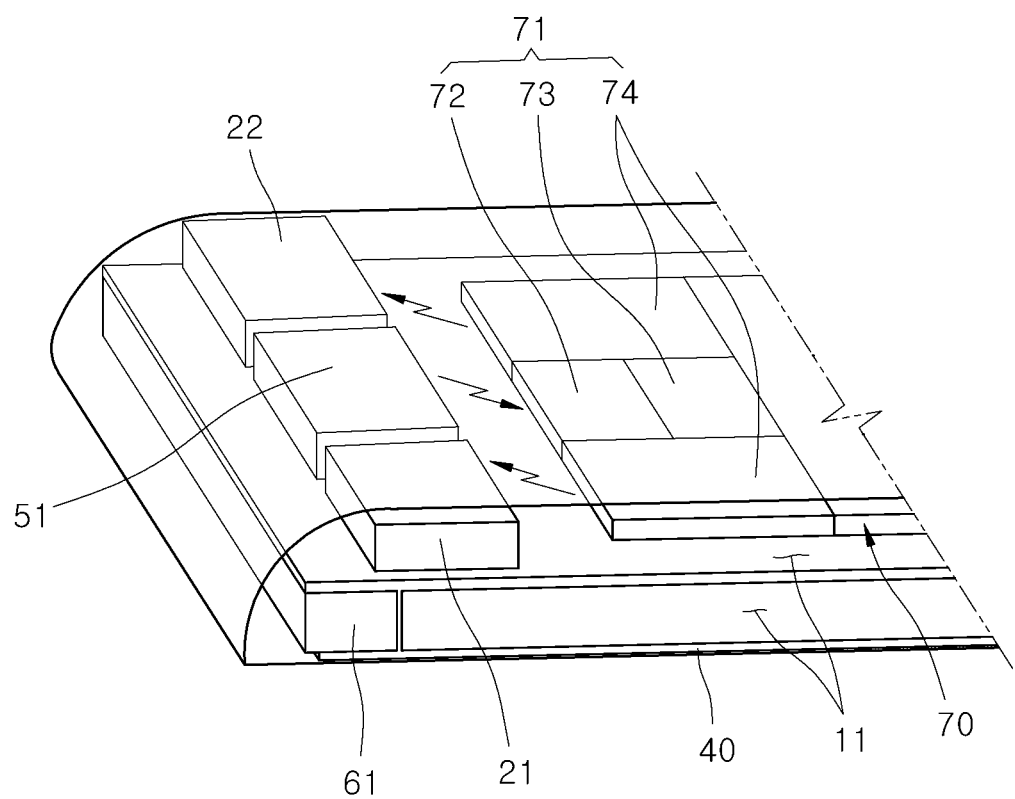
FIG. 3 is a cross-sectional view of main parts of FIG. 2.
Figure 4:
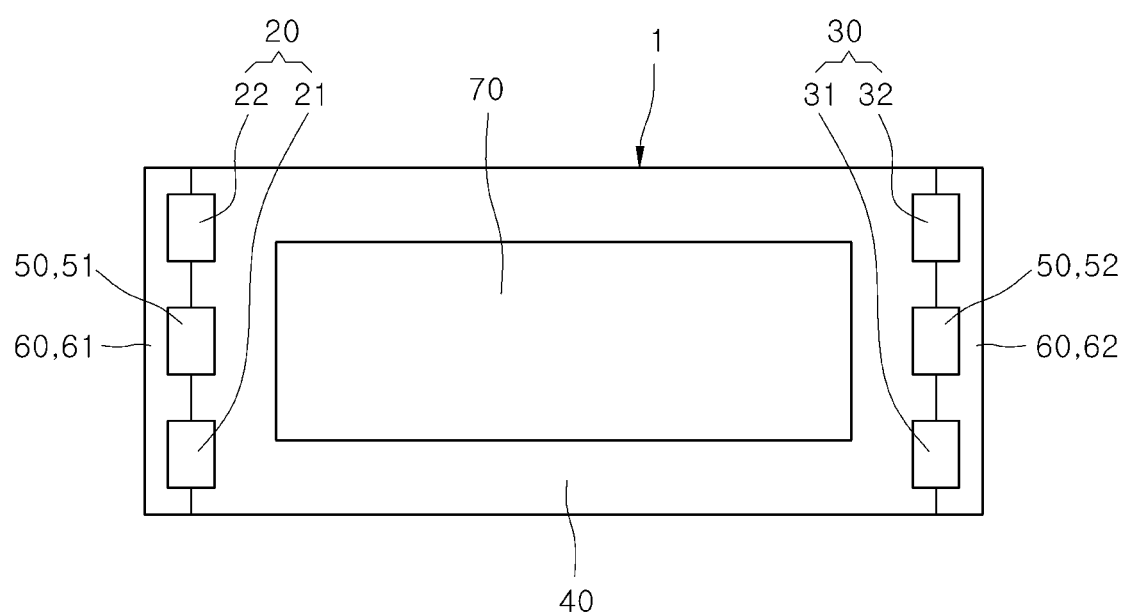
FIG. 4 is a plan view schematically illustrating the lighting apparatus of the autonomous vehicle in accordance with the embodiment of the present disclosure.

FIG. 2 is a perspective view schematically illustrating the lighting apparatus of the autonomous vehicle in accordance with the embodiment of the present disclosure, FIG. 3 is a cross-sectional view of main parts of FIG. 2, and FIG. 4 is a plan view schematically illustrating the lighting apparatus of the autonomous vehicle in accordance with the embodiment of the present disclosure.

Referring to FIGS. 2 to 4, the lighting apparatus 1 of the autonomous vehicle 2 in accordance with the embodiment of the present disclosure includes a lamp box 10, a front lamp unit 20, a rear lamp unit 30, an interior lamp unit 40, a sensor unit 50, a communication lamp unit 60 and a control unit 70.

The lamp box 10 has a box shape in which the front lamp unit 20, the rear lamp unit 30, the interior lamp unit 40, the sensor unit 50 and the communication lamp unit 60 can be integrated and housed, and is made of a transparent material such as glass, which can distribute lights, emitted from the front lamp unit 20, the rear lamp unit 30, the interior lamp unit 40, the sensor unit 50 and the communication lamp unit 60, to the outside of the lamp box 10.

The front lamp unit 20 serves to distribute light to a forward area of the vehicle 2, and is housed in a front portion of the lamp box 10. The front lamp unit 20 in accordance with the embodiment of the present disclosure includes a first front lamp 21 and a second front lamp 22. The first front lamp 21 serves to mainly illuminate a left portion of the forward area of the vehicle 2, and is disposed in a left portion of the lamp box 10. The second front lamp 22 serves to mainly illuminate a right portion of the forward area of the vehicle 2, and is disposed in a right portion of the lamp box 10.

The rear lamp unit 30 serves to distribute light to a rearward area of the vehicle 2, and is housed in a rear portion of the lamp box 10. The rear lamp unit 30 in accordance with the embodiment of the present disclosure includes a first rear lamp 31 and a second rear lamp 32. The first rear lamp 31 serves to mainly illuminate a left portion of the rearward area of the vehicle 2, and is disposed in the left portion of the lamp box 10. The second rear lamp 32 serves to mainly illuminate a left portion of the rearward area of the vehicle 2, and is disposed in the right portion of the lamp box 10.

The interior lamp unit 40 serves to distribute light to the inside of the vehicle 2, and is disposed in a lower portion of the lamp box 10. The interior lamp unit 40 is disposed to face the inside of the vehicle 2, and light emitted from the interior lamp unit 40 propagates downward to illuminate the inside of the vehicle 2.

The sensor unit 50 serves to sense a driving condition or surrounding situation of the vehicle 2, and is housed in the lamp box 10 and installed in the roof part 3 of the vehicle 2. Thus, a sensing area can be secured and expanded more stably than when the sensor unit 50 is installed under the roof part 3. The sensor unit 50 is an essential element for implementing autonomous driving, and the available autonomous driving level of the vehicle 2 is changed according to the specification of the sensor unit 50 and the number of sensors included in the sensor unit 50.

As the sensor unit 50, a LiDAR (Light Detection And Ranging), a camera, a radar, an ultrasonic sensor or the like may be selectively applied. The sensor unit 50 in accordance with the embodiment of the present disclosure includes a front sensor 51 and a rear sensor 52.

The front sensor 51 serves to mainly sense a driving condition or surrounding situation of the forward area of the vehicle 2, and is disposed at the front portion of the lamp box 10 so as to be located in parallel to the front lamp unit 20 in a side-to-side direction. The front sensor 51 may be installed at a plurality of locations separated from each other. When the front sensor 51 is installed at one location, the front sensor 51 may be disposed between the first and second front lamps 21 and 22 or in the center of the front portion of the lamp box 10.

As the front sensor 51 is disposed in the center of the front portion of the lamp box 10 and the first and second front lamps 21 and 22 are disposed on the left and right sides of the front portion of the lamp box 10, respectively, it is possible to not only secure visibility across a width which is further increased in the side-to-side direction, using the first and second front lamps 21 and 22, but also uniformly sense the driving condition or the surrounding situation across the forward area of the vehicle 2 using the front sensor 51, without focusing on the left or right side.

The rear sensor 52 serves to mainly sense a driving condition or surrounding situation of the rearward area of the vehicle 2, and is disposed at the rear portion of the lamp box 10 so as to be located in parallel to the rear lamp unit 30 in the side-to-side direction. The rear sensor 52 may be installed at a plurality of locations separated from each other. When the rear sensor 52 is installed at one location, the rear sensor 52 may be disposed between the first and second rear lamps 31 and 32 or in the center of the rear portion of the lamp box 10.

As the rear sensor 52 is disposed in the center of the rear portion of the lamp box 10 and the first and second rear lamps 31 and 32 are disposed on the left and right sides of the rear portion of the lamp box 10, respectively, it is possible to not only secure visibility across a width which is further increased in the side-to-side direction, using the first and second rear lamps 31 and 32, but also uniformly sense the driving condition or the surrounding situation using the rear sensor 52, without focusing on the left or right side.

The sensor unit 50 in accordance with the embodiment of the present disclosure may not be limited to the structure illustrated in FIGS. 2 to 4, but the plurality of sensor units 50 may be installed in multiple directions. A plurality of LiDARs may be installed in multiple directions to sense objects around the vehicle 2 and distances from the objects. For example, the LiDARs may be disposed at five locations which include four locations corresponding to the front left end, the front right end, the rear left end and the rear right end of the lamp box 10 and one location corresponding to the front center, in order to secure sensing areas across the 360-degree area around the vehicle 2. A plurality of cameras may be installed in multiple directions to sense the surrounding situations of the vehicle 2 through images. For example, 11 cameras may be installed on the lamp box 10.

The sensor unit 50 may be arranged on the same horizontal line as each of the front and rear lamp units 20 and 30 so as to be adjacent to each of the front and rear lamp units 20 and 30, or arranged and stacked on the same vertical line as the communication lamp unit 60, in order to implement sensing performance for providing the autonomous driving level 4 or more. According to such arrangement structures, the monitoring area of the sensor unit 50 and the lighting areas of the front lamp unit 20, the rear lamp unit 30 and the communication lamp unit 60 may be formed to overlap each other.

The LiDAR serves to three-dimensionally image the surrounding environment through a laser scanning method using light, and the camera serves to visually acquire information on the surrounding environment in the form of image. The sensitivities and image qualities of the LiDAR and the camera may be affected by brightness, and the LiDAR and the camera may be used efficiently in terms of energy, with illumination intensity raised by lights emitted from the front lamp unit 20, the rear lamp unit 30 and the communication lamp unit 60.

The communication lamp unit 60 serves to display information associated with driving of the vehicle 2, and is disposed at each of the front and rear portions of the lamp box 10 such that the front lamp unit 20 or the rear lamp unit 30 is stacked over the communication lamp unit 60. The communication lamp unit 60 has a width in the top-to-bottom direction, and is extended in the side-to-side direction. The communication lamp unit 60 is extended in the form of a screen, and displays information associated with the driving state of the vehicle using various combinations of light patterns and colors.

For example, the communication lamp unit 60 can display various autonomous driving states in different forms, the various autonomous driving states including a state in which autonomous driving is stopped, a state which is switched to autonomous driving, a state in which autonomous driving is performed, and the like. The communication lamp unit 60 in accordance with the embodiment of the present disclosure includes a front communication lamp 61 and a rear communication lamp 62.

The front communication lamp 61 is disposed under the front lamp unit 20 and the front sensor 51, and extended in the side-to-side direction while having a width in a top-to-bottom direction. The rear communication lamp 62 is disposed under the rear lamp unit 30 and the rear sensor 52, and extended in the side-to-side direction while having a width in the top-to-bottom direction. The front and rear communication lamps 61 and 62 may be used to display information, characters and symbols, which are associated with the driving states of the vehicle, in all directions of the vehicle.

The control unit 70 serves to control the operations of the front lamp unit 20, the rear lamp unit 30, the interior lamp unit 40, the sensor unit 50 and the communication lamp unit 60, and is housed in the lamp box 10. The control unit 70 may be disposed in an available space 11 formed in the lamp box 10, while having various structures and arrangements.

The lighting apparatus 1 of the autonomous vehicle 2 in accordance with the embodiment of the present disclosure has a structure in which the front lamp unit 20, the rear lamp unit 30, the interior lamp unit 40, the sensor unit 50, the communication lamp unit 60 and the control unit 70 are integrated as one product having a box shape or frame shape corresponding to the lamp box 10 as described above.

Therefore, it is possible to significantly reduce the number of parts, compared to a structure in which small-size modules corresponding to the front lamp unit 20, the rear lamp unit 30, the interior lamp unit 40, the sensor unit 50 and the communication lamp unit 60, respectively, are independently disposed at locations which are separated from each other and include the bonnet area of the vehicle 2. Furthermore, the lamp electronic units can be easily installed in the roof part 3 having an infinite available space, and easily replaced and maintained.

Furthermore, since the lamp electronic units do not need to be necessarily reduced in size, high-specification modules can be applied as the front lamp unit 20, the rear lamp unit 30, the interior lamp unit 40, the sensor unit 50, the communication lamp unit 60 and the control unit 70, respectively, even though the volumes of the modules are increased. Therefore, the performance of the lighting apparatus can be more freely improved, and the autonomous driving performance and the use convenience of the vehicle 2 can be further improved.

When electronic components corresponding to the front lamp unit 20, the rear lamp unit 30, the sensor unit 50 and the communication lamp unit 60, respectively, are individually installed in the vehicle 2 even though the electronic components coincide with the automotive EMC (Electro Magnetic Compatibility) condition, there is a limitation in estimating an influence on the entire vehicle 2 or the electromagnetic interference among the components.

As the front lamp unit 20, the rear lamp unit 30, the interior lamp unit 40, the sensor unit 50 and the communication lamp unit 60 are integrated as one module, an electromagnetic radiation test considering the electromagnetic interference among the components can be performed more efficiently. Therefore, it is possible to further reduce errors which occur when electronic components corresponding to the front lamp unit 20, the rear lamp unit 30, the interior lamp unit 40, the sensor unit 50 and the communication lamp unit 60 are individually tested.

Figure 5:
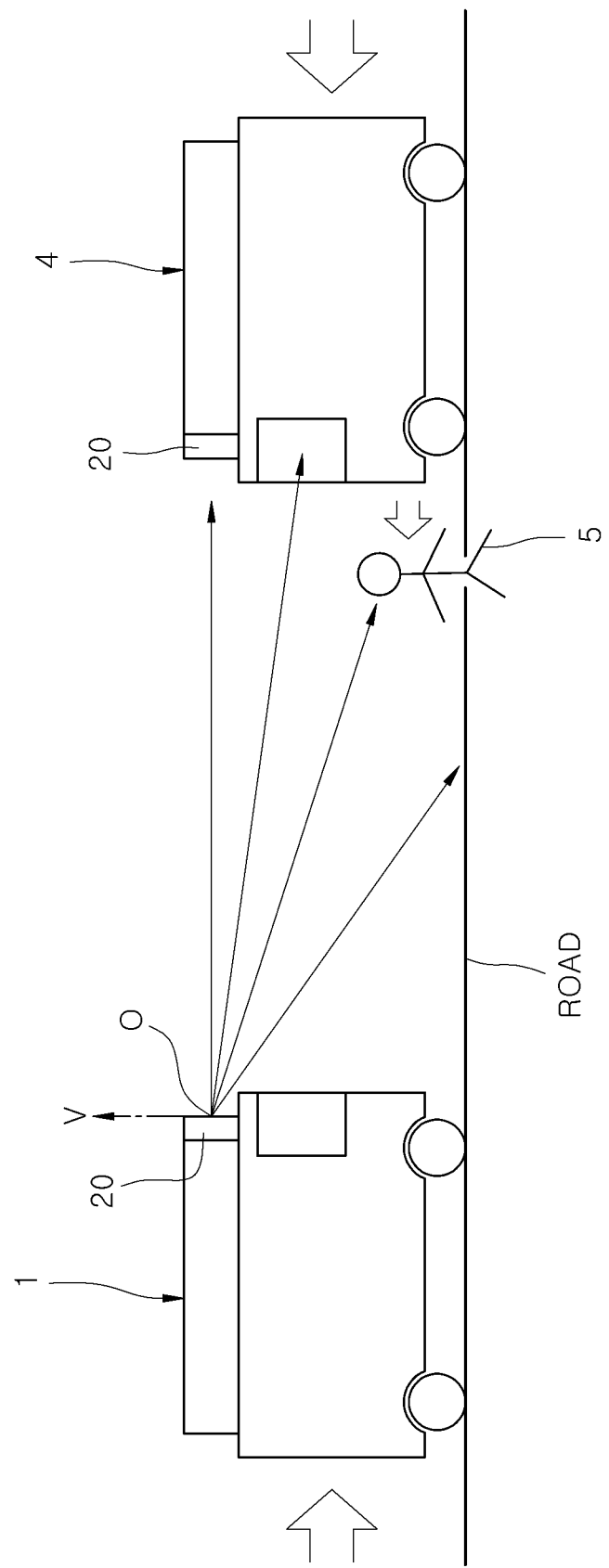
FIG. 5 is a perspective view for describing a light emission area formed by the lighting apparatus of the autonomous vehicle in accordance with the embodiment of the present disclosure.
Figure 6:
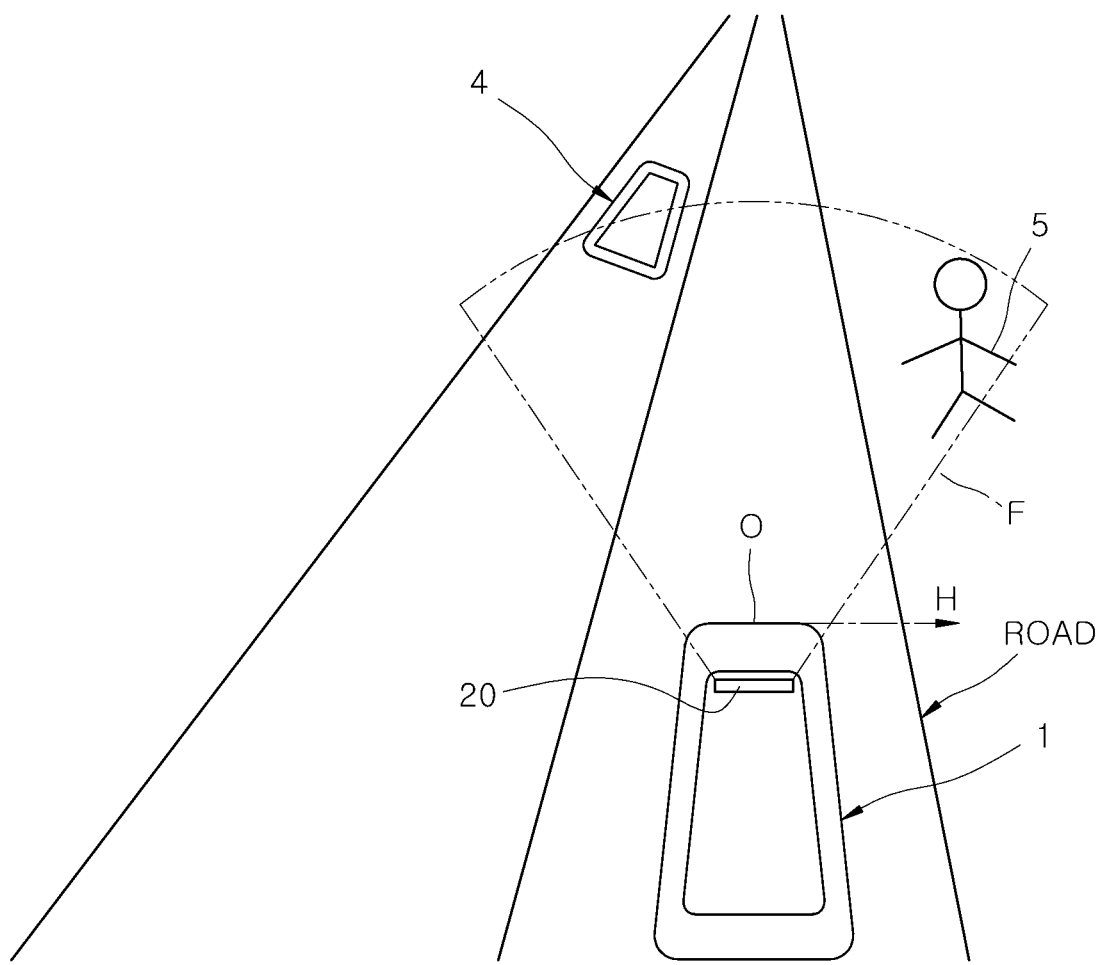
FIG. 6 is a side view for describing the light emission area formed by the lighting apparatus of the autonomous vehicle in accordance with the embodiment of the present disclosure.
Figure 7:
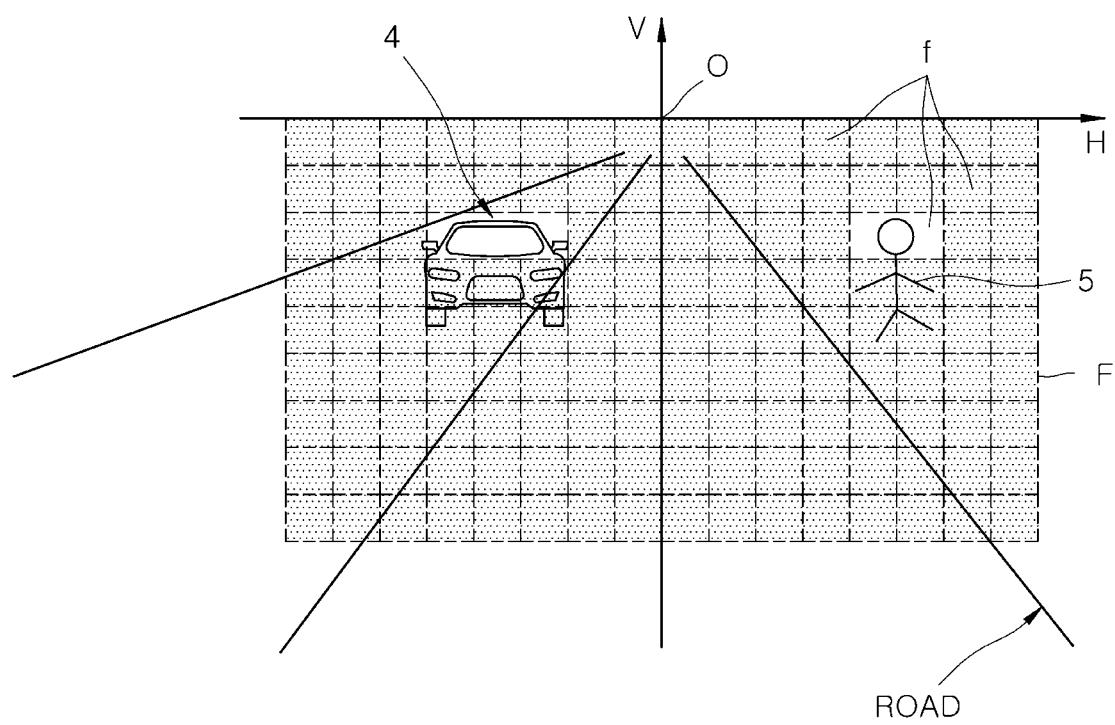
FIG. 7 is a front view for describing the light emission area formed by the lighting apparatus of the autonomous vehicle in accordance with the embodiment of the present disclosure.

FIG. 5 is a perspective view for describing a light emission area formed by the lighting apparatus of the autonomous vehicle in accordance with the embodiment of the present disclosure, FIG. 6 is a side view for describing the light emission area formed by the lighting apparatus of the autonomous vehicle in accordance with the embodiment of the present disclosure, and FIG. 7 is a front view for describing the light emission area formed by the lighting apparatus of the autonomous vehicle in accordance with the embodiment of the present disclosure.

The roof part 3 in accordance with the embodiment of the present disclosure may be set to a part of the vehicle 2, which is disposed at a height of 1,200 mm or more from the ground. As the lighting apparatus 1 of the autonomous vehicle 2 in accordance with the embodiment of the present disclosure is disposed at the roof part 3 of the vehicle 2, the lighting apparatus 1 is disposed at a height of 1,200 mm or more from the ground. Therefore, when the front lamp unit 20 and the rear lamp unit 30 are used to illuminate forward and rearward areas, the lighting apparatus 1 can stably form a light emission area F in the forward/rearward area by only emitting light downward, with the installation position of the front/rear lamp unit 20/30 set to a reference position O as illustrated in FIGS. 5 to 7. Thus the front/rear lamp unit 20/30 may be directed to only emit light downward at or below the reference position O.

The first and second front lamps 21 and 22 constituting the front lamp unit 20 forms one integrated light emission area F. Thus, the following descriptions related to the light emission area F will be based on the supposition that the front lamp unit 20 is disposed in the center of the vehicle 2, while the overlap, interference and influence between the light emission areas formed by the first and second front lamps 21 and 22, respectively, are ignored. The same supposition is also applied to the rear lamp unit 30.

The front lamp unit 20 and the rear lamp unit 30 in accordance with the embodiment of the present disclosure emit light downward from the reference position O, thereby stably forming the light emission area F where surrounding objects including another vehicle 4, a pedestrian 5 or the like can be checked. Compared to the case in which at least a part of the light emission area F belongs to the upper side of the reference position O, unnecessary power consumption can be reduced, and the operation can be performed efficiently in terms of energy. At this time, the front lamp unit 20 and the rear lamp unit 30 emit light vertically symmetrically with respect to the reference position O, such that the lighting apparatus 1 can uniformly sense the driving condition or the surrounding situation across the forward area of the vehicle 2 without focusing on the left or right side.

Figure 8:
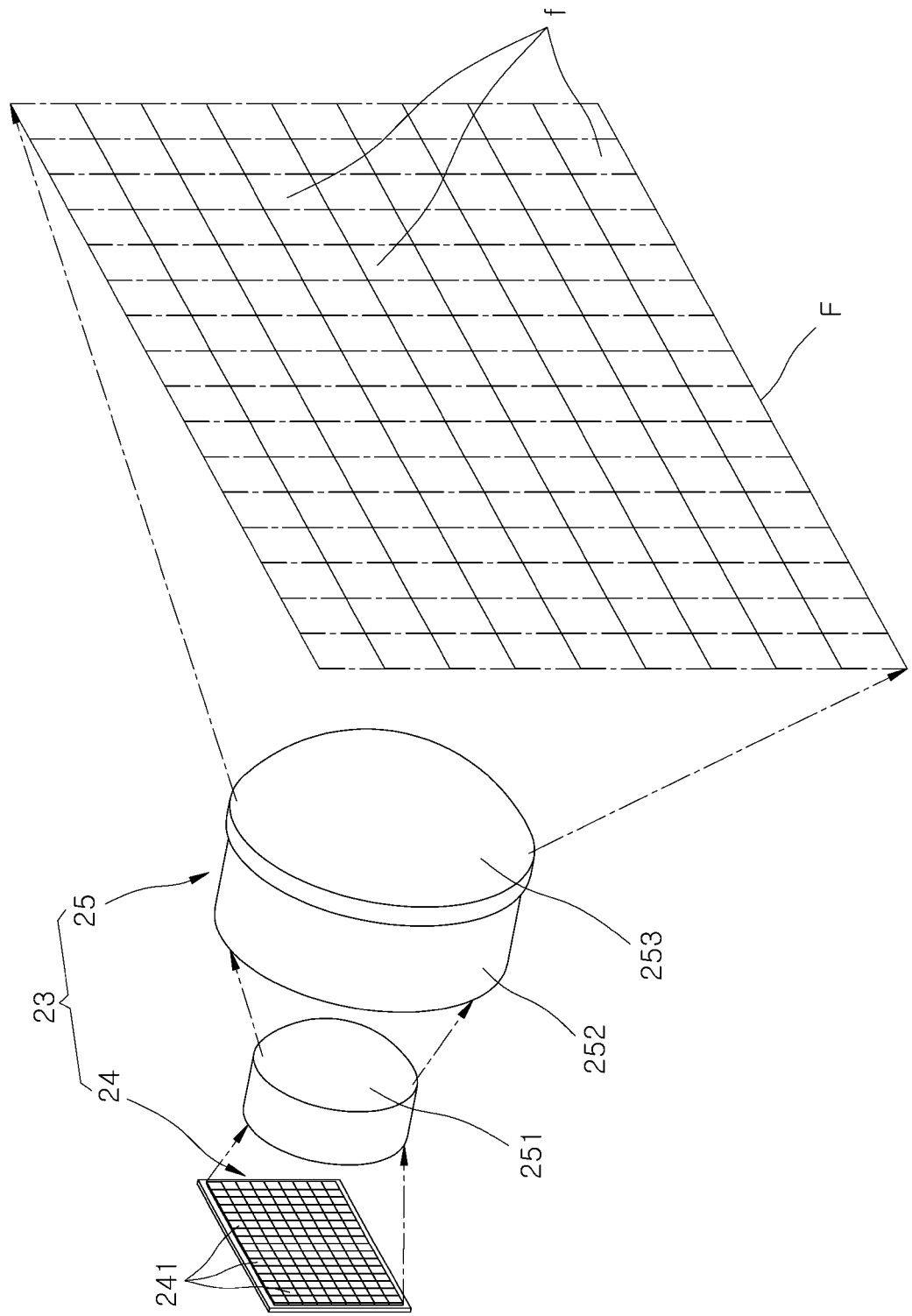
FIG. 8 is a perspective view schematically illustrating an image forming optical unit of the lighting apparatus of the autonomous vehicle in accordance with the embodiment of the present disclosure.
Figure 9:
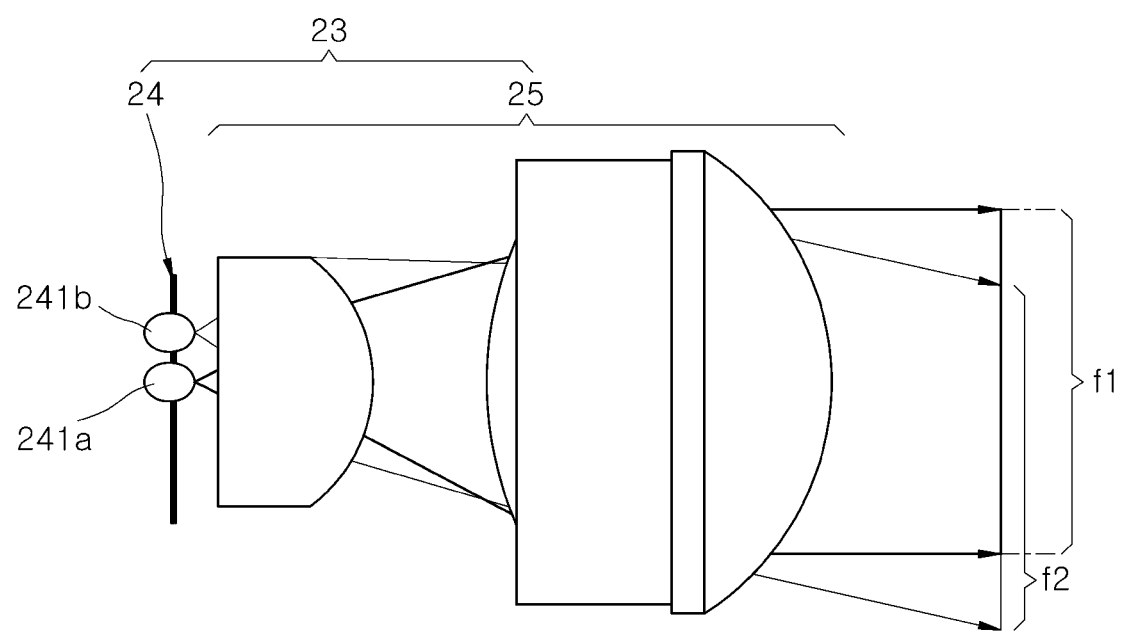
FIG. 9 is a plan view schematically illustrating the image forming optical unit of the lighting apparatus of the autonomous vehicle in accordance with the embodiment of the present disclosure.

FIG. 8 is a perspective view schematically illustrating an image forming optical unit of the lighting apparatus of the autonomous vehicle in accordance with the embodiment of the present disclosure, and FIG. 9 is a plan view schematically illustrating the image forming optical unit of the lighting apparatus of the autonomous vehicle in accordance with the embodiment of the present disclosure.

The light emission area F formed by the front lamp unit 20 in accordance with the embodiment of the present disclosure has a beam pattern in which a plurality of unit light emission areas f are arranged vertically and horizontally as illustrated in FIG. 7. More specifically, the light emission area F has a structure in which the unit light emission areas f are disposed under the reference position O and arranged vertically symmetrically with respect to the reference position O. Such a beam pattern can be implemented through the image forming optical unit 23 illustrated in FIGS. 8 and 9.

Referring to FIGS. 8 and 9, the image forming optical unit 23 in accordance with the embodiment of the present disclosure includes a light source unit 24 and an image forming lens unit 25.

The light source unit 24 includes a plurality of light sources 241 which are vertically and horizontally arranged on one plane. The plurality of light sources 241 include a first light source 241a and a second light source 241b disposed adjacent to the first light source 241a. Examples of the light source unit 24 may include a micro LED having an LED arrangement of micro pixels constituting pixel elements, respectively.

The image forming lens unit 25 forms a light emission area F whose width is increased more than that of the unit light emission area f, while refracting lights emitted from the plurality of light sources 241 such that the lights propagate to different areas. The above-described optical action can be implemented by a refractive index that satisfies the Petzval condition or a combination of a plurality of convex and concave lenses formed in different shapes.

The image forming lens unit 25 can be implemented as various embodiments, and is not limited to specific structures including a publicly known structure applied as a headlamp for a vehicle, as long as the image forming lens unit 25 can implement the above-described optical action. Therefore, the detailed descriptions of the shapes, structures and operations of the plurality of lenses constituting the image forming lens unit 25 will be omitted herein. For example, the image forming lens unit 25 may include a condensing lens 251, a beam pattern conversion lens 252 and an optical refractive lens 253. The condensing lens 251 improves optical efficiency by condensing light emitted from the light source 241, the beam pattern conversion lens 252 increases the beam pattern size of the light source unit in the top-to-bottom direction, and the optical refractive lens 253 forms an image of light, having passed through the beam pattern conversion lens 252, on a screen (not illustrated), and scatters the image onto the road.

Referring to FIG. 9, the light emission area F includes a first unit light emission area f1 and a second unit light emission area f2. The first unit light emission area f1 is formed while light emitted from the first light source 241a transmits the image forming lens unit 25, and the second unit light emission area f2 is formed while light emitted from the second light source 241b transmits the image forming lens unit 25, and disposed adjacent to the first unit light emission area f1.

The first light source 241a is disposed at a location corresponding to the center of the image forming lens unit 25, and light emitted from the first light source 241a passes through the image forming lens unit 25 as axial and straight ray, and thus form the first unit light emission area f1. The light emitted from the second light source 241b passes through the image forming lens unit 25 as non-axial and oblique ray, and thus forms the second unit light emission area f2 adjacent to the first unit light emission area f1. When the first and second unit light emission areas f1 and f2 are disposed adjacent to each other, the first and second unit light emission areas f1 and f2 may partially overlap each other.

The control unit 70 includes an individual light source controller 71 which selectively enables or disables the plurality of unit light emission areas f. Referring to FIG. 3, the individual light source controller 71 in accordance with the embodiment of the present disclosure includes an input unit 72, a light-out area determination unit 73 and a light source control unit 74.

The input unit 72 receives information from the sensor unit 50 for sensing the surroundings of the vehicle 2. The light-out area determination unit 73 determines a unit light emission area f which needs to be disabled in the light emission area F, based on the information inputted from the input unit 72. For a specific example, the light-out area determination unit 73 may determine a unit light emission area f corresponding to the driver seat of the another vehicle 4 and the eyes of the pedestrian 5, based on the information inputted from the input unit 72.

The light source control unit 74 turns off the light source 241 corresponding to the unit light emission area f determined by the light-out area determination unit 73. When the light source control unit 74 determines the unit light emission area f corresponding to the driver seat of the another vehicle 4 and the eyes of the pedestrian 5 and turns off the light source 241 corresponding to the unit light emission area f, the unit light emission area f corresponding to the driver seat of the another vehicle 4 and the eyes of the pedestrian 5 in the light emission area F is disabled as illustrated in FIG. 7.

When the unit light emission area f is disabled, it may indicate that light is not emitted to the unit light emission area for does not reach the unit light emission area f. Some of the light sources 241 may be turned off to form a dark zone in the light emission area F.

The image forming optical unit 23 in accordance with the embodiment of the present disclosure, which has the above-described configuration, may individually control the plurality of light sources 241 constituting the light source unit 24, and thus prevent glare from disturbing the visions of the driver of the another vehicle 4 and the pedestrian 5. Thus, it is possible to not only reduce the possibility that an accident will occur due to glare, but also further improve the driving stability.

The lighting apparatus 1 of the autonomous vehicle 2 in accordance with the embodiment of the present disclosure can implement a lamp module with a new structure, in which the front lamp unit 20, the rear lamp unit 30, the interior lamp unit 40, the control unit 70 and other lamp electronic parts and sensor electronic parts are integrated and packaged in the lamp box 10 disposed in the roof part 3 of the vehicle 2.

Therefore, the lighting apparatus 1 in accordance with the embodiment of the present disclosure can significantly reduce the number of parts, compared to the structure in which small-size modules corresponding to the front lamp unit 20, the rear lamp unit 30, the interior lamp unit 40, the sensor unit 50 and the communication lamp unit 60, respectively, are independently disposed at locations which are separated from each other and include the bonnet area of the vehicle. Furthermore, the lamp electronic parts can be easily replaced and maintained.

Furthermore, the lamp electronic parts can be easily installed in the roof part 3 having an infinite available space. Therefore, compared to an embodiment in which lamp electronic parts are disposed and designed in a relatively narrow bonnet area, the lamp electronic parts can be disposed and designed more freely and easily in a cabin area of the vehicle, and the degree of freedom in design of the vehicle body can be improved.

Since the lamp electronic parts are installed in the roof part 3, the lamp electronic parts do not need to be necessarily reduced in sizes. Therefore, the performances of the front lamp unit 20, the rear lamp unit 30, the interior lamp unit 40 and the control unit 70 can be freely improved without a limitation in design by the increase in volumes of electronic parts. Thus, it is possible to improve the autonomous driving performance and use convenience of the vehicle 2 by applying high-specification electronic parts.

The lighting apparatus 1 in accordance with the embodiment of the present disclosure has a structure in which a plurality of lamp electronic parts including the front lamp unit 20, the rear lamp unit 30 and the interior lamp unit 40 are integrated as one module. Therefore, an electromagnetic radiation test considering electromagnetic interference between the electronic parts can be performed more efficiently than when a plurality of electronic parts are individually tested and assembled to the vehicle body. Thus, it is possible to further reduce errors which occur when electronic components corresponding to the front lamp unit 20, the rear lamp unit 30 and the interior lamp unit 40, respectively, are individually tested.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A lighting apparatus of an autonomous vehicle, comprising:
    a lamp box disposed in a roof part of a vehicle;
    one or more front lamp units housed in a front portion of the lamp box and configured to distribute light to a forward area of the vehicle;
    one or more rear lamp units housed in a rear portion of the lamp box and configured to distribute light to a rearward area of the vehicle;
    one or more interior lamp units disposed at the bottom of the lamp box, and configured to distribute light to an indoor area of the vehicle;
    a control unit configured to control operations of the front lamp unit, the rear lamp unit and the interior lamp unit;
    one or more front communication lamps housed in the lamp box and disposed under the front lamp unit so as to be extended in a side-to-side direction, the one or more front communication lamps configured to display information associated with driving of the vehicle; and
    one or more rear communication lamps housed in the lamp box and disposed under the rear lamp unit so as to be extended in the side-to-side direction, the one or more rear communication lamps configured to display information associated with driving of the vehicle.

2. The lighting apparatus of an autonomous vehicle of claim 1, further comprising one or more sensor units housed in the lamp box, and configured to sense a driving condition or surrounding situation of the vehicle.

3. The lighting apparatus of an autonomous vehicle of claim 2, wherein the sensor unit comprises:
    one or more front sensors disposed in the front portion of the lamp box so as to be located in parallel to the front lamp unit; and
    one or more rear sensors disposed in the rear portion of the lamp box so as to be located in parallel to the rear lamp unit.

4. The lighting apparatus of an autonomous vehicle of claim 3, wherein the front lamp unit comprises:
    one or more first front lamps disposed in a left portion of the lamp box; and
    one or more second front lamps disposed in a right portion of the lamp box,
    wherein the front sensor is disposed between the first and second front lamps.

5. The lighting apparatus of an autonomous vehicle of claim 3, wherein the rear lamp unit comprises:
    one or more first rear lamps disposed in a left portion of the lamp box; and
    one or more second rear lamps disposed in a right portion of the lamp box,
    wherein the rear sensor is disposed between the first and second rear lamps.

6. The lighting apparatus of an autonomous vehicle of claim 1, wherein at least one of the front and rear lamp units comprises one or more image forming optical units configured to form a light emission area having a beam pattern in which a plurality of unit light emission areas are vertically and horizontally arranged.

7. The lighting apparatus of an autonomous vehicle of claim 6, wherein the plurality of unit light emission areas of the beam pattern are vertically symmetrically arranged under the roof part.

8. The lighting apparatus of an autonomous vehicle of claim 6, wherein the image forming optical unit comprises:
    a light source unit having a plurality of light sources arranged vertically and horizontally; and
    an image forming lens unit configured to refract lights emitted from the plurality of light sources such that the lights propagate to different areas, and form the light emission area whose width is increased more than the unit light emission area.

9. A lighting apparatus mounted on a portion of a vehicle, comprising:

a first lamp unit disposed on a first side of the portion of the vehicle and configured to emit light in a first light emission area;

a second lamp unit disposed on a second side of the portion of the vehicle and configured to emit light in a second light emission area;

a first sensor unit disposed on the first side of the vehicle and configured to detect vehicle surroundings faced by the first lamp unit; and a control unit configured to receive sensor data from the sensor unit and control light emission characteristics of light emitted by the first lamp unit in the first light emission area;

one or more front communication lamps disposed under the first lamp unit so as to be extended in a side-to-side direction, the one or more front communication lamps configured to display information associated with driving of the vehicle; and one or more rear communication lamps disposed under the second lamp unit so as to be extended in the side-to-side direction, the one or more rear communication lamps configured to display information associated with driving of the vehicle.

10. The apparatus of claim 9, wherein the portion of the vehicle is the roof.

11. The apparatus of claim 9, wherein the sensor data includes images of an approaching driver and the control unit controls the first lamp unit to darken out a portion of the first light emission area corresponding to the driver.

12. The apparatus of claim 9, wherein the first lamp unit comprises a right lamp unit and a left lamp unit with the sensor unit disposed therebetween.

13. The apparatus of claim 9, wherein the first lamp unit includes a reference position and the first lamp unit is directed by the control unit to only emit light downward at or below the reference position.

14. The apparatus of claim 9, further comprising an interior lamp unit configured to illuminate interior portions of the vehicle, the interior lamp unit positioned below the first lamp unit.

15. The apparatus of claim 9, further comprising:
a lamp box disposed in a roof part of a vehicle,
wherein the one or more front communication lamps and the one or more rear communication lamps are housed in the lamp box.

* * * * *